United States Patent [19]
Blaschke et al.

[11] 3,909,688
[45] Sept. 30, 1975

[54] METHOD AND APPARATUS FOR DETERMINING THE INITIAL ROTOR ANGLE IN A ROTATING FIELD MACHINE

[75] Inventors: Felix Blaschke; Walter Dreiseitl, both of Erlangen, Germany

[73] Assignee: Siemens Aktiengesellschaft, Munich, Germany

[22] Filed: Oct. 10, 1974

[21] Appl. No.: 513,753

[30] Foreign Application Priority Data
Oct. 25, 1973 Germany............................ 2353594

[52] U.S. Cl.................. 318/227; 318/230; 318/231
[51] Int. Cl.²........................................... H02P 5/40
[58] Field of Search................... 318/227, 230, 231

[56] References Cited
UNITED STATES PATENTS

| 3,500,152 | 3/1970 | Landau et al.... | 318/227 |
| 3,512,067 | 5/1970 | Landau............ | 318/227 |
| 3,700,986 | 10/1972 | Cushman et al.... | 318/231 X |
| 3,796,935 | 3/1974 | Blaschke.......... | 318/227 |
| 3,824,437 | 7/1974 | Blaschke.......... | 318/230 |

*Primary Examiner*—B. Dobeck
*Attorney, Agent, or Firm*—Kenyon & Kenyon Reilly Carr & Chapin

[57] ABSTRACT

A method and apparatus for determining the initial rotor angle in a rotating field machine in which a voltage step is applied to the excitation winding of the machine and to a simulated network and the measured stator voltage vector and simulated voltage vector, after transformation through an assumed rotor angle, used to determine an angular difference which is used to correct the assumed rotor angle until it agrees with the actual rotor angle.

5 Claims, 14 Drawing Figures

METHOD AND APPARATUS FOR DETERMINING THE INITIAL ROTOR ANGLE IN A ROTATING FIELD MACHINE

BACKGROUND OF THE INVENTION

This invention relates to converter fed rotating field machines in general and more particularly to a method and apparatus for determining the initial angular position of the rotor, upon starting in such a machine.

In converter fed rotating field machines, particularly those which are automatically controlled, the angular position of the rotor referred to the stator is used to control the stator currents. In order to pick up the instantaneous rotor angle a pulse transmitter coupled to the magnet wheel and synchronized by a reference pulse per revolution providing an input into a counter is typically used. As described in Siemens-Zeitschrift, 1971, pages 765 to 768 the count of the counter then represents the actual rotor angle.

Using this known method for sensing rotor angle an accurate count corresponding to the actual rotor position is available only after an initial reference pulse appears to return the counter to zero. Prior to that time the count of the counter can be at any value and does not necessarily correspond to the actual rotor position. Because of this a difficulty arises in properly starting a converter fed rotating field machine and makes a defined starting of an automatically controlled rotating field machine impossible.

In view of these difficulties it is the object of the present invention to provide a method and apparatus for determining the initial rotor angle thereby permitting the counter to be set to the correct count before starting of the machine.

SUMMARY OF THE PRESENT INVENTION

The present invention accomplishes this by carrying out steps as follows:

a. with the stator winding de-energized, a voltage step is applied to the excitation winding of the rotating field machine and the angular position of the stator voltage vector, referred to the stator is measured from the voltages induced in the stator windings;
b. in a network simulating the machine, the angular position, referred to the stator, of a simulated stator voltage vector is computed from the same voltage step using the assumed rotor angle corresponding to the count presently in the counter;
c. the simulated angular position is compared with the measured angular position of the stator voltage vector to determine an angular difference;
d. the count of the counter is changed by the existing angular distance until the angular position of the measured stator voltage vector agrees with the angular position of the simulated stator voltage vector.

In carrying out the method of the present invention a voltage step is applied to the machine and to a simulated network before starting of the machine. Using an assumed rotor angle corresponding to the count in the counter and the voltage step the angular position referred to the stator of a simulated stator voltage vector is computed using the simulated network and is then compared with the measured angular position. If the assumed rotor angle as represented by the count in the counter is incorrect an angular difference will be computed which is then used to correct the counter to bring the angle stored therein in agreement with the actual angle. The machine is then ready for starting.

The method of the present invention is particularly well suited for use in a converter fed rotating field maching having field oriented control such as that described in Siemens-Zeitschrift 45 (1971), pages 765–768. A bidirectional counter and a sine-cosine wave generator for transforming the count of the counter into components of the rotor angle are used for sensing the rotor angle. When applied in such an arrangement the method of the present invention then comprises the following steps:

a. with the stator windings de-energized a voltage step is applied to the excitation winding of a rotating field machine and the components of the angular position, referred to the stator, of the measured stator voltage vector determined from the voltages induced in the stator windings;
b. the components of an angular position, referred to the rotor of a simulated stator voltage vector are computed in a simulated network from the same voltage step;
c. from the computed components of the angular position of the simulated stator voltage vector referred to the rotor and from the components of the rotor angle corresponding to the count presently in the counter there is formed in the simulated network the components of an aggregate angle which is the angular position of the simulated stator voltage vector referred to the stator;
d. the components of an angular difference are formed using the components of the angular position of the simulated stator voltage vector referred to the stator and from the components of the angular position of the measured stator voltage referred to the stator;
e. a quantity which depends on the angular difference and which changes the count of the counter such as to correct it is formed from the components of angular difference and applies a correcting signal until the angular position of the measured stator voltage vector agrees with the angular position of the simulated stator voltage vector.

BRIEF DESCRIPTION OF THE DRAWINGS

FIG. 11b is a wave form diagram helpful in understanding the operation of the circuit of FIG. 11a.

DETAILED DESCRIPTION OF THE PREFERRED EMBODIMENT

Figure 1:
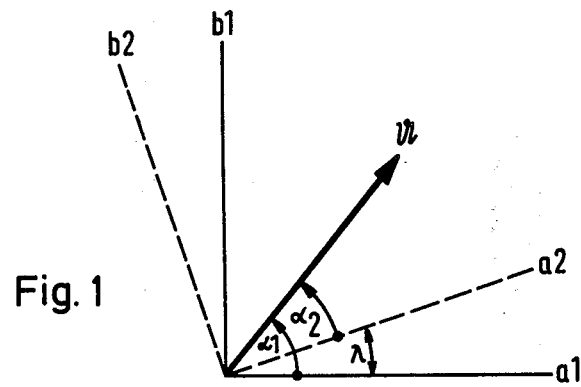
FIG. 1 is a voltage diagram helpful in understanding the operation of the present invention.

FIG. 1 is a vector diagram helpful in understanding the operation of the present invention. The stator voltage vector is designated $V$. Stator coordinates are $a1$ and $b1$ and the rotor coordinates $a2$ and $b2$. As illustrated, the stator voltage vector $V$ makes an angle $\alpha 1$ with the axis $a1$ in the stator based system and an angle $\alpha 2$ with the axis $a2$ in the rotor based system. The two systems of coordinates are offset by an angle $\lambda$. In the following discussion the index 1 will be used for quantities referred to the stator and the index 2 for quantities referred to the rotor in accordance with FIG. 1.

Figure 2:
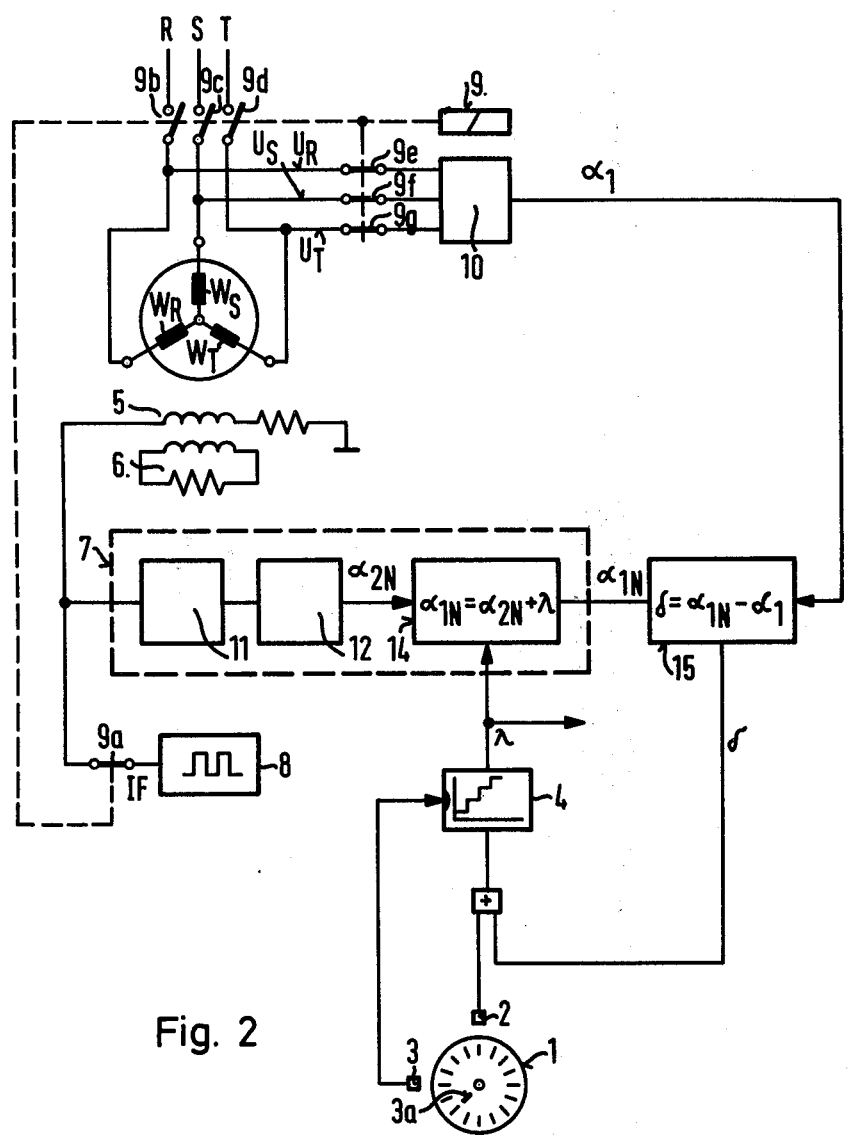
FIG. 2 is a block diagram of a synchronous machine using the method and apparatus of the present invention.

FIG. 2 illustrates an application of the method of the present invention to a synchronous machine. A digital pulse transmitter comprising a pulse wheel 1 coupled to the magnet wheel of the machine and having two probes 2 and 3 is used for a determination of the rotor angle $\lambda$. Pulse wheel 1 supports a first signal track having a great number of optically, electrically or magnetically detectable elements evenly distributed over its circumference. Probe 2 scans the elements and forms pulses used to drive a counter 4. The probe 3 responds to another similar element 3a on the pulse wheel to emit a reference pulse for synchronization of the counter once each revolution. Thus with each revelution of the pulse wheel and the rotor of the rotating field machine to which it is attached the reference pulse will set the counter to zero. After that the counter again increases counting the pulses of probe 2.

As noted above it is of particular importance to know the actual rotor angle right at the moment of starting the machine, for example, in order to develop a break away torque. Since with the machine turned off the rotor can move without indication of this being stored in the counter, and for other reasons, upon initial energization of the machine the counter 4 will not necessarily contain a count representing the actual rotor angle. To overcome this problem apparatus such as that shown on FIG. 2 and to now be described is used for carrying out the method of the present invention to determine the rotor angle prior to starting the machine. Prior to starting, the relay 9 is energized and its contacts 9a through 9g brought into the position shown on the Fig. A pulse sequence designated IF developed in a pulse transmitter 8 is applied through the contact 9a in the form of a succession of voltage steps to the excitation winding 5 of the machine. At the same time it is applied to a simulated network 7. During the carrying out of the method of the present invention the contacts 9a through 9g remain in the position shown. Only when the stator windings $W_R$, $W_S$ and $W_T$ are connected to the three phase supply member R, S and T are the relay contacts reversed.

The voltage step applied to the excitation winding 5 induces the voltages in the damping winding 6 and in the stator windings $W_R$, $W_S$ and $W_T$ of the rotating field machine. The voltages developed in the latter appear as the voltages $U_R$, $U_S$ and $U_T$. These voltages are fed through the contacts 9e, 9f and 9g to an angle converter 10 which determines an angular position such as the angular position $\alpha 1$ shown above on FIG. 1 i.e., the position of the stator vector referred to the stator coordinate system. When the machine is not running the measured stator voltage vector $V_1$ will be parallel to the axis of the excitation winding 5.

The simulation network 7 to which the steps are also applied contains a first module 11 used for the simulation of the excitation. Following this is a second module 12 used for the computation of an angular position $\alpha_{2N}$ of a simulated stator voltage vector $V_{2N}$ in the rotor coordinate system. The output from this module is provided to an angle summing means 14 which transforms the angular position $\alpha_{2N}$ referred to the rotor into an angular position $\alpha_{1N}$ referred to the stator representing the angle which the simulated stator vector makes with the stator coordinate system. i.e., it adds to the vector position in the rotor coordinate system the angle $\lambda$ as obtained from the counter 4. This angle is noted above is an assumed or an incidental rotor angle not necessarily representing the true rotor angle. The simulated angle $\alpha_{1N}$ so determined is provided along with the measured angle $\alpha_1$ to an angle comparator 15 which develops a difference $\delta$ between the two which difference is used to provide a correction input to the counter 4. For this purpose the output is provided an OR gate having as its second input the output of the probe 2. With each succeeding pulse IF, on the pulse train IF, if a difference exist a pulse will be provided to the counter 4 and the counter 4 will continually be corrected until agreement is reached between the simulated angle $\alpha_{1N}$ and the actual angle $\alpha_1$. i.e., until the angular difference becomes zero or approximately zero. At that point the angular position $\alpha_1$ of the measured stator voltage $V_1$ is essentially equal to the computed angular position $\alpha_{1N}$ of the simulated stator voltage vector $V_{2N}$. As a result the count of the counter 4 now accurately represents the actual instantaneous rotor angle $\lambda$. The relay 9 can now be reversed and the machine started.

Figure 3:
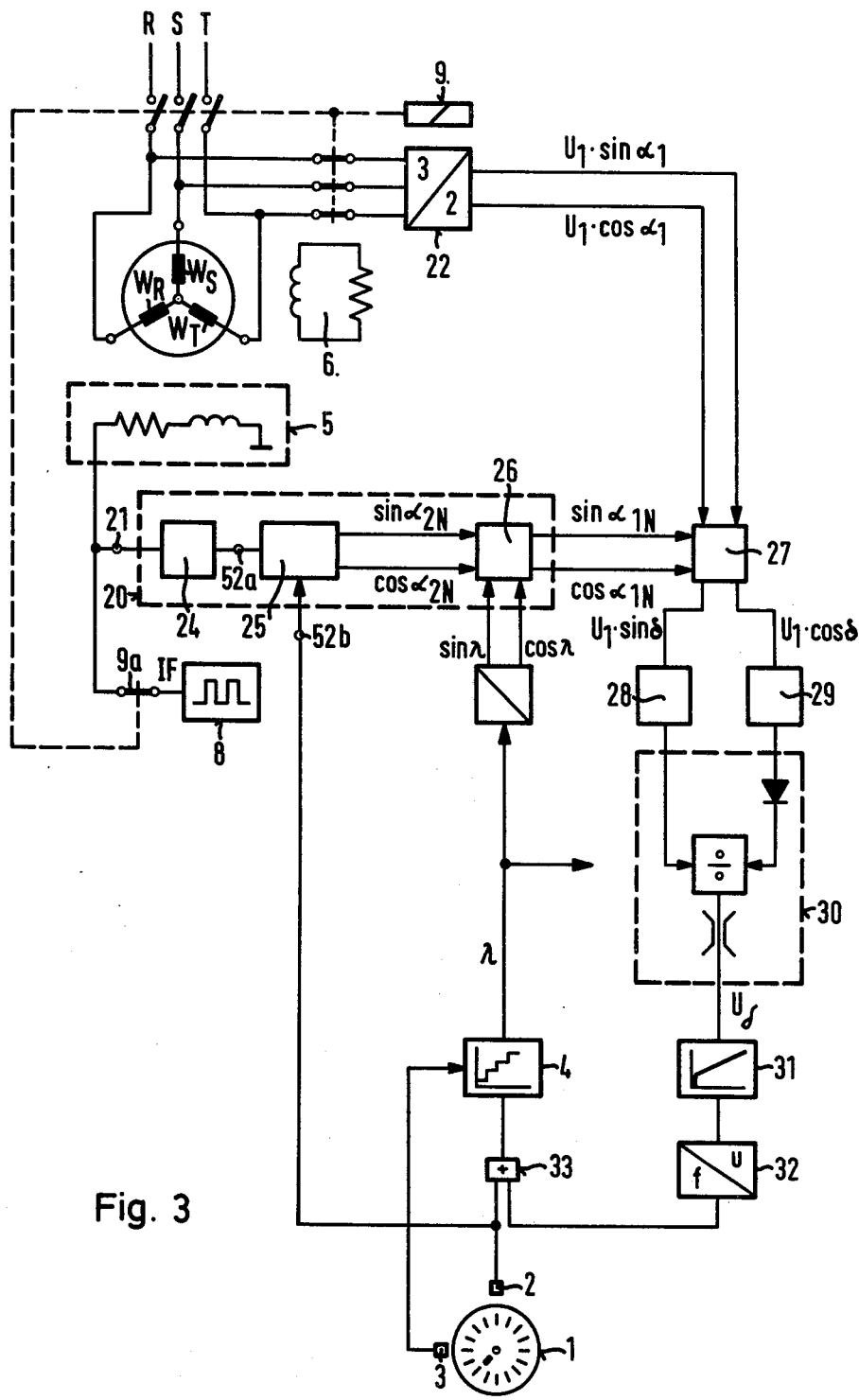
FIG. 3 is a block diagram for a synchronous machine controlled by field orientation and using the method and apparatus of the present invention.

FIG. 3 is a block diagram of a synchronous machine controlled by field orientation and having associated therewith apparatus for carrying out the method of the present invention. In the diagram of FIG. 3 components identical to those FIG. 2 are given the same reference numerals.

Once again a clock generator 8 generates a pulse sequence IF which is coupled through the contact 9a to the excitation winding 5 of the rotating field machine input 21 of a simulated network 20. A component converter 22 described in more detail on FIG. 5 is used to determine components $U_1$ sine $\alpha_1$ and $U_1$ and cos $\alpha_1$ of the stator voltage vector $V_1$ referred to the stator using the voltage $U_R$, $U_S$ and $U_T$ induced in the stator windings $W_R$, $W_S$ and $W_T$. How this occurs is illustrated on FIG. 4 which will be explained in more detail below. The simulated network includes a first module 24 used for simulating the exciter machine. It is followed by a second module 25 used for the simulation of the machines stator voltage vector $V_{2N}$ referred to the rotor. A vector rotator 26 described in more detail on FIG. 9 using the component output sine $\alpha_{2N}$ and cos $\alpha_{2N}$ representing the angular position $\alpha_{2N}$ referred to the rotor and components sine $\lambda$ and cos $\lambda$ of the rotor angle $\lambda$ obtained from the count of the counter 4 to develop outputs sine $\alpha_{1N}$ and cos $\alpha_{1N}$ representing the angular position $\alpha_{1N}$ of the simulated stator voltage $V_{1N}$ referred to the stator. The output of the counter is provided through a sine cosine generator of conventional design to develop these quantities sine λ and cos λ. These outputs are provided to an inverse vector rotator 27 described in more detail in connection with FIG. 10 along with the quantity $U_1$ sine $α_1$ and $U_1$ cos $α_1$. The inverse vector rotator 27 uses these quantities to determine quantities $U_1$ sine $δ_1$ and U cos $δ_1$. The components are then smoothed in smoothing members 28 and 29 after which they are provided to a divider 30 described in more detail on FIG. 1 which develops as an output the quantity U δ which depends on the angular difference δ. The quantity U δ is fed to a control unit 31 which has its output voltage supplied to the input of a voltage frequency converter 32. The voltage frequency converter 32 provides a pulse train of correcting pulses as an output which are coupled to the counter 4 through an OR gate 33. These will correct the count in the counter until agreement is reached between the assumed angle and the actual angle at which point the output of the control unit 31 will become zero and pulses from the voltage to frequency converter 32 will cease.

Figure 4A:
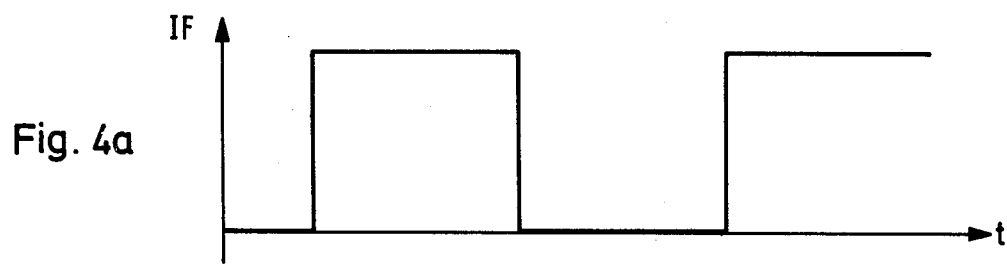
FIG. 4a–4e are wave form diagrams illustrating the effect on various portions of the system of the step voltage applied thereto.
Figure 4B:
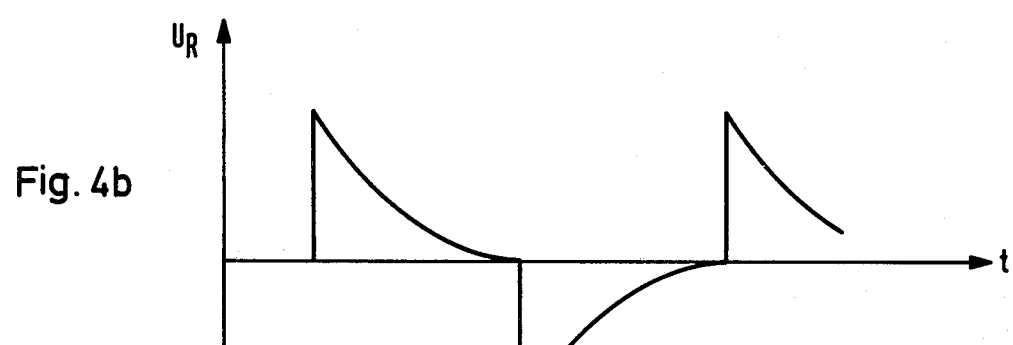
Figure 4C:
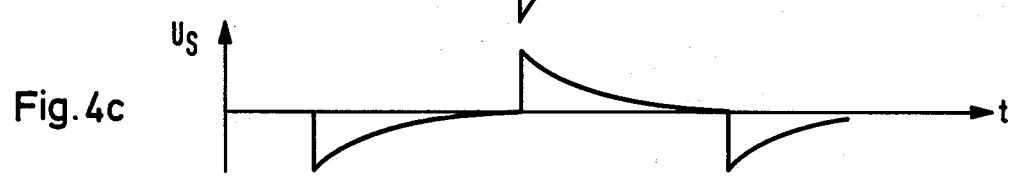
Figure 4D:
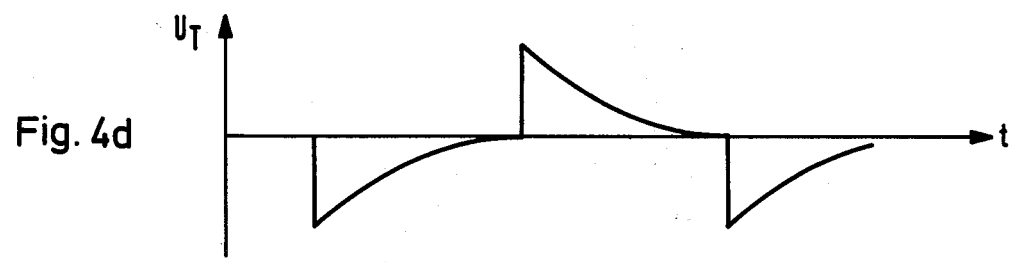
Figure 4E:
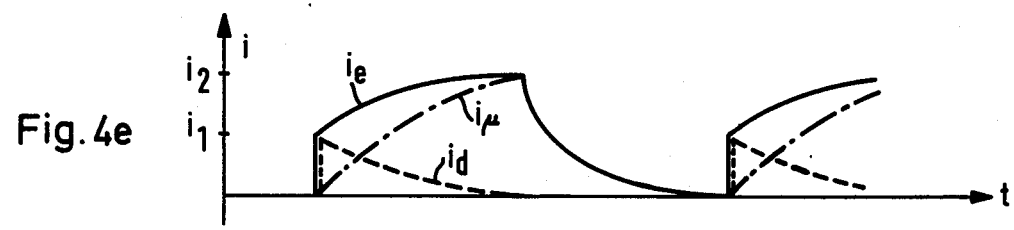
Figure 5:
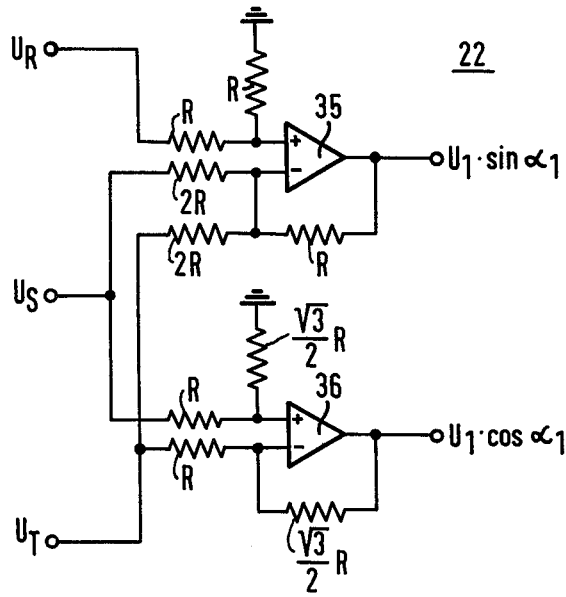
FIG. 5 is a circuit diagram of a component converter used in the system of FIG. 3.

FIGS. 4a through e are wave form diagrams illustrating the application of a step voltage to the excitation winding and the resulting voltages in the stator windings. Illustrated by FIG. 4a is the application of the pulse sequence IF to the excitation winding 5. FIGS. 4b, 4c and 4d illustrate, respectively, the voltages, with respect to time induced in the windings $W_R$, $W_S$ and $W_T$ respectively i.e., the voltages $U_R$, $U_S$ and $U_T$. FIG. 4e illustrates the wave form of the excitation current $i_e$ with respect to time along with illustrating the same for the magnetization current $i_u$ and the current $i_d$ in the damping coil.

The voltage step applied to the excitation winding results in an excitation current which initially goes to the value $i_1$ and then increases exponentially to a maximum value $i_2$ after which it falls off. The current $i_d$ in the damping coil also jumps to the value $i_1$ and then fades out exponentially. The magnetization current $i_u$ induces in the stator windings the voltage components $U_R$, $R_S$ and $U_T$ of the stator voltage vector. Where correction cannot be carried out with a signal voltage step the succession of voltage steps as illustrated on FIG. 4a and as alluded to above is applied to the excitation winding.

FIG. 5 illustrates a circuit diagram for the component converter 22 of FIG. 3. In this circuit the three components $U_R$, $U_S$ and $U_T$ must be converted into the voltages $U_1$ sin $α_1$ and $U_1$ cos $α_1$. As illustrated this is accomplished using amplifiers 35 and 36 each having all three stator voltage components as inputs with their input resistors and feedback resistors and the polarity of the input properly selected to provide the desired output.

Figure 6:
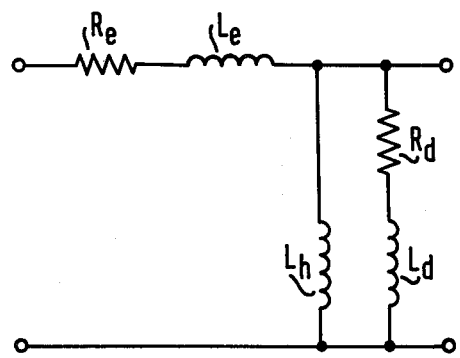
FIG. 6 is an equivalent circuit diagram of the synchronous machine of FIG. 3.

FIG. 6 illustrates an equivalent circuit of the synchronous machine having the principal inductance $L_h$ the exciter resistance $R_e$ and an exciter inductance $L_e$ in the excitation winding 5. Shown also is a damping resistor the damping resistance $R_d$ and the damping inductance $L_d$ of the damping coil. The equivalent circuit illustrated has the frequency response of a second order system.

Figure 7:
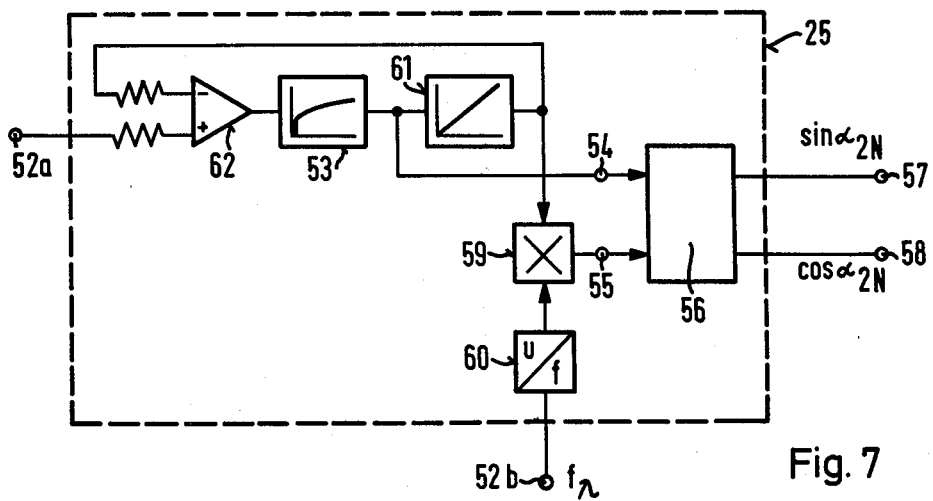
FIG. 7 is a circuit diagram of a portion of the simulation circuit of FIG. 3.

FIG. 7 illustrates a circuit diagram of the second module 25 for simulating the machine's stator voltage vector referred to the rotor as described above in connection with FIG. 3. The input terminal 52a will have the output of the first module 24 which will be a signal simulating the exciter machine. At the second input 52b the output frequency of the probe 2 of FIG. 3 will appear. This is necessary since the rotor can be moving at this time and the effect of such rotation must be taken into consideration. For example such rotation can come about due to the action of the load when the stator windings are not carrying current.

Assume first that the rotor is stationary while the angular position is being determined. The output signal of the first module 24 for simulating the exciter machine and which represents the excitation voltage is then provided through the input terminal 52a to a lead circuit 53 which simulates the frequency response of the equivalent circuit of FIG. 6. The output signal of the lead circuit 53 is provided to the input terminal 54 of vector analyzer 56 to be described below. In order that the rotor rotation occurring while the angular position is being measured cannot falsify the result of the measurement the multiplier 59 provides to the vector analyzer 56 a component which takes rotation into consideration. A multiplier 59 has as a first input a voltage simulating rotor speed generated by a frequency to voltage converter 60 having as an input frequency $f$ at terminal 52b. The second input to the multiplier 59 is the output signal of an integral control unit 61 representing the magnetization current $i_u$. The output signal of the integral control unit is fed back to the inverting input of a summing amplifier 62 to whose noninverting input the output signal from the first module 24 is provided.

Where the resistance and inductance of the excitation winding and of the damping coil are the same magnitude, the lead circuit 53 is simply a proportional circuit having a proportional factor of one-half.

Figure 8:
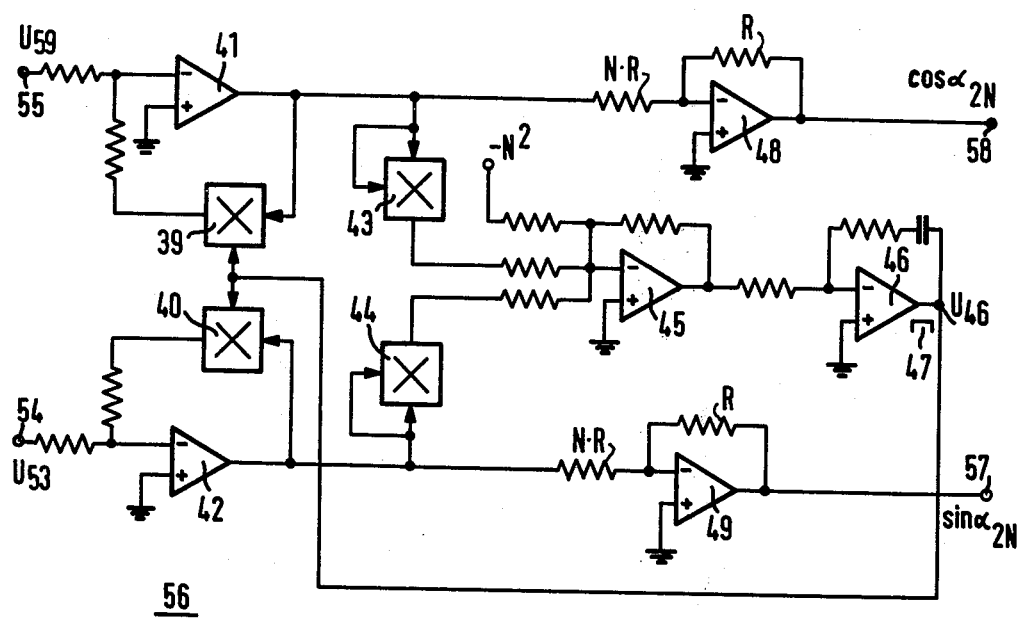
FIG. 8 is a circuit diagram of the vector analyzer of FIG. 3.

FIG. 8 is a circuit diagram of the vector analyzer 56 of FIG. 7. At its input 54 the output signal of the lead circuit 53 designated $U_{53}$ is provided through an appropriate input resistor to the inverting input of an amplifier 42. This amplifier has in its feedback circuit a multiplier 40. The output of the multiplier 40 is provided as a second input through a further input resistor to the inverting input of amplifier 42. Similarly an input at terminal 55 from the multiplier 59 and thus designated $U_{59}$ is provided to the inverting input of an amplifier 41 having a multiplier 39 in its feedback path. The output of the multiplier 39 is again provided through an appropriate input resistor to the inverting input of amplifier 41. The output voltages of the amplifiers 41 and 42 are squared and multipliers 43 and 44 respectively. The outputs of the multipliers 43 and 44 are provided through appropriate inputs to the inverting input of an amplifier 45. Amplifier 45 has as an additional input through a further input resistor a voltage representing a quanity $-N^2$. The output of the summing amplifier 45 is provided through an input resistor to the inverting terminal of an amplifier 46 having a capacitor and resistor in its feedback back and thus acting as an integrator. The output of the amplifier or integrator 46 is limited to zero using a limiting means indicated schematically as 47. Such can be in the form of limiting diodes applied in a manner well known in the art. This output is provided as the second input to the two multipliers 39 and 40. The output of the integrator 46 is designated $U_{46}$. With this arrangement, the voltage $-U_{59}/U_{46}$ will appear at the output of amplifier 41 and the voltage $-U_{53}/U_{46}$ will appear at the output of amplifier 42 due to the negative feedback of the multipliers 39 and 40. The output of the integrator 46 will change until its input comes to zero. This will occur when the following condition is met:

$$U_{46} = 1/N \times \sqrt{U_{59}^2 + U_{53}^2}$$

The output voltages of the amplifiers 41 and 42 are supplied to the inverting terminals of amplifiers 48 and 49 respectively, each of these amplifiers having negative feedback. The relationship of the feedback resistors and input resistors in these amplifiers is 1:N. The components $\sin \alpha_{2N}$ and $\cos \alpha_{2N}$ will thus appear at the output terminals 57 and 58.

Figure 9:
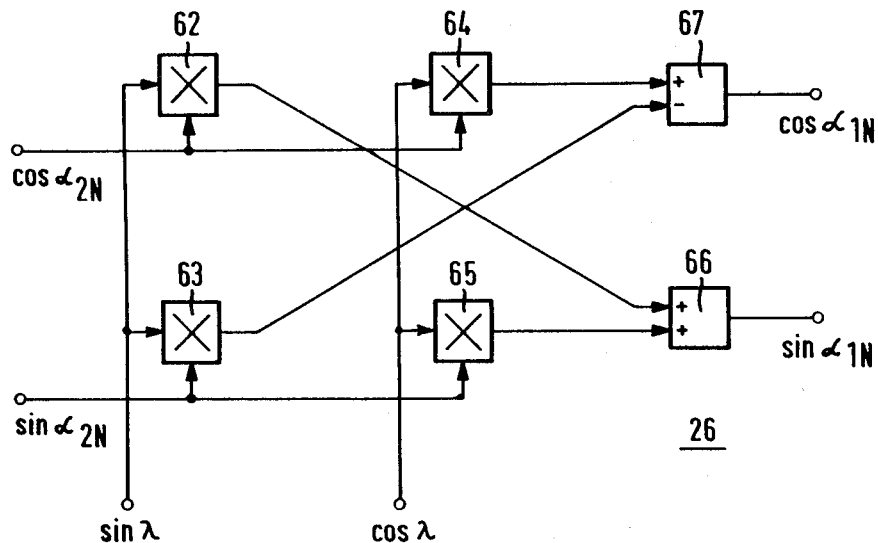
FIG. 9 is a circuit diagram of the vector rotator of FIG. 3.

FIG. 9 illustrates a circuit diagram for the vector rotator 26 used to determine the components $\sin \alpha_{1N}$ and $\cos \alpha_{1N}$ representing the angular position $\alpha_{1N}$, referred to the stator from the components $\cos \alpha_{2N}$ and $\sin \alpha_{2N}$.

As noted above, this circuit transforms the vector referenced to the rotor to a vector referenced to the stator coordinate system. As noted above, the value $\sin \lambda$ and $\cos \lambda$ are obtained from an output of the counter. The input $\cos \alpha_{2N}$ is provided as one input to each of two multipliers 64 and 65. Multipliers 62 has as its second input $\sin \lambda$ and multiplier 64 as its second input $\cos \lambda$. The input $\sin \alpha_{2N}$ is provided as inputs to multipliers 63 and 65 which similarly have as their second input the quantities $\sin \lambda$ and $\cos \lambda$ respectively. The output of multipliers 63 and 64 are sumed in summing means 67 such as a summing amplifier and those of multiplier 62 and 65 and summing means 66. Polarities must be as illustrated on the Fig. The illustrated circuit carries out the following equations:

$$\sin\alpha_{1N} = \sin(\alpha_{2N} + \lambda) = \sin\alpha_{2N} \cdot \cos\lambda + \cos\alpha_{2N} \cdot \sin\lambda$$
$$\cos\alpha_{1N} = \cos(\alpha_{2N} + \lambda) = \cos\alpha_{2N} \cdot \cos\lambda - \sin\alpha_{2N} \cdot \sin\lambda$$

Figure 10:
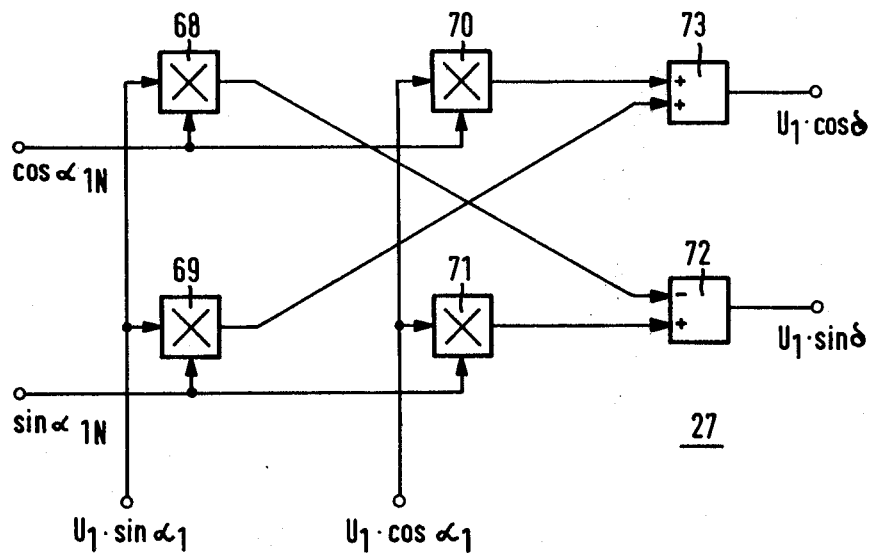
FIG. 10 is a circuit diagram of the inverse vector rotator of FIG. 3.

FIG. 10 illustrates a circuit diagram of the inverse vector rotator 27 used to form a component $U_1 \cdot \sin \delta$ and $U_1 \cdot \cos \delta$ from the components $\sin \alpha_{1N}$ and $\cos \alpha_{1N}$ of the angular position $\alpha_{1N}$ of the simulated stator vector $V_{2N}$ referred to the stator and from the components $U_1 \sin \alpha_1$ and $U_1 \cos \alpha_1$, the components of the measured stator voltage vector. $\cos \alpha_{1N}$ is provided as inputs to multipliers 68 and 70 and $\sin \alpha_{1N}$ to multipliers 69 and 71. $U_1 \sin \alpha_1$ is the second input to multiplier 68 and 69 and $U_1 \cos \alpha_1$ second input to multiplier 70 and 71. The outputs of multipliers 69 and 70 are added in summing means 73 and the outputs of multipliers 68 and 71 subtracted in summing means or subtracting means 72 to develop the final output signals. The equations solved by these summing means or subtracting means 72 to develop the final output signals. The equations solved by these circuits are as follows:

$$U_1 \cdot \sin\delta = U_1 \cdot \sin(\alpha_{1N} + \alpha_1) = U_1 \cdot (\sin\alpha_{1N}\cos\alpha_1 -_{co}\cos\alpha_{1N} \cdot \sin\alpha_1)$$
$$U_1 \cdot \cos\delta = U_1 \cdot \cos(\alpha_{1N} - \alpha_1) = U_1 \cdot (\cos\alpha_{1N}\cos\alpha_1 + \sin\alpha_{1N} \cdot \sin\alpha_1)$$

The adding and subtracting means of both FIGS. 9 and 10 can be summing amplifiers with their appropriate inverting and non inverting terminals employed in well known fashion.

Figure 11A:
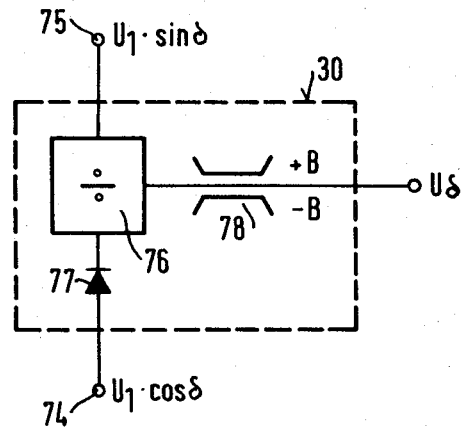
FIG. 11a is a circuit diagram of the dividing circuit of FIG. 3.
Figure 11B:
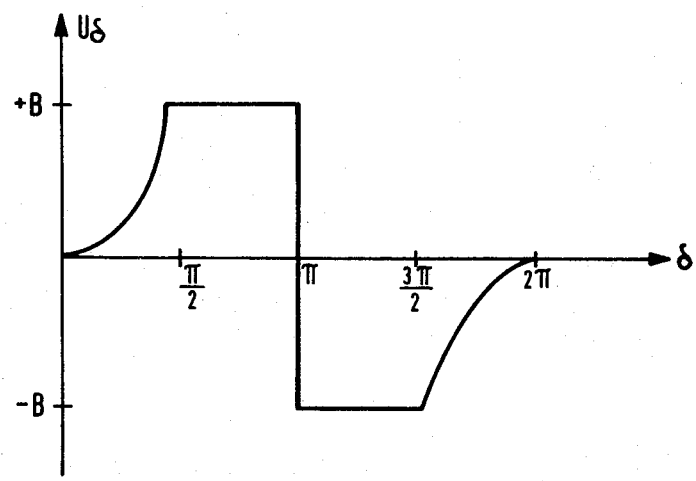

FIG. 11a is a circuit diagram of the dividing circuit 30 of FIG. 3. As noted above it forms an output quanity $U\delta$ which is a function of the angular difference using as inputs the quantities $U \sin \delta$ and $U \cos \delta$. FIG. 11b illustrates the relationship of the quantity U to the angular difference. In this circuit the component $U_1 \sin \delta$ is provided as a dividend to the input terminal 75 of a divider 76 and the component $U_1 \cos \delta$ as a divisor to the input terminal 74. From these two quantities the divider 76 forms the tangent of the angular difference $\delta$. The result of this division is the magnitude of the vector V. In the first quadrant the output voltage $U \delta$ increases as a tangent until limited to a value B+ by means indicated schematically by 78. In addition the input $U_1 \cos \delta$ is limited positive values. Limiting such as the limiting to + and −B can be carried out in conventional fashion using Zenner diodes or the like. In the second quadrant the component $U_1 \cos\delta$ is negative and thus cut off by the diode 77. In that case a division by zero takes place. However the result is kept at the cut off value +B by the limiting circuit. In the third quadrant both the components $U_1 \sin\delta$ and $U_1 \cos\delta$ are negative. As a result the polarity of the output signal $U\delta$ is limited to the negative cut off value −B. In the fourth quadrant $\cos \delta$ is again positive resulting in an output voltage $U \delta$ following the tangent function. As a result, this circuit operates in a manner such that the angular difference cannot be determined in the second and third quadrants. However this is immaterial since the purpose of the output of the circuit of FIG. 11a i.e., circuit 30 is to influence the count of the counter through the voltage to frequency converter 32 in the proper sense to cause the angular difference to disappear i.e., the idea is to get the angular difference down to zero. Note that when far from zero one of the limiting values will be effective to be driving the counter at a maximum rate toward zero and that as zero is approached the tangent function which for small angles is approximately proportional to the angle becomes effective. Thus, the purpose of the circuit is achieved even though it does not absolutely represent the angular difference.

The integral controller such as the controller 31 and 61 along with the lead circuit 53 can be constructed in well known fashion using operational amplifiers. The controllers for example can simply be integrators such as those described at paragraph II.10 and II.11 of "Applications Manual for Operational Amplifiers for Modeling Measuring Manipulating and Much Else" published by Philbrick Nexus Research (1968). In this manual and other similar manuals the design of these and other convention analog circuit is disclosed.

Thus, an improved method and apparatus for determining the initial angular position of a rotor in a converter fed rotating field machine has been shown. Although specific methods and embodiments have been illustrated and described, it will be obvious to those skilled in the art that various modifications may be made without departing from the spirit of the invention which is intended to be limited solely by the appended claims.

What is claimed is:

1. A method for determining the initial rotor angle in a converter fed rotating field machine of the type wherein the rotor angle referred to the stator is indicated by the count of a counter driven by pulses from a pulse transmitter coupled to the magnet wheel of the machine and synchronized by a reference pulse one each revolution comprising the steps of:

a. applying a voltage step to the excitation winding of the rotating field machine with the stator windings turned off;

b. determining from the voltage induced in the stator windings the angular position of the stator voltage vector referred to the stator;
c. providing a network simulating the machine;
d. applying said voltage step to said simulated network;
e. also applying to said network a signal representing the rotor angle stored in the counter;
f. determining in said simulated network the angular position of a simulated stator voltage vector referred to the stator;
g. determining the angular difference between the measured angular position of the stator voltage vector and the angular position of the simulated stator voltage vector;
h. changing the count of said counter until the difference between the measured angular position and the angular position of the simulated stator voltage vector agree.

2. The method according to claim 1 wherein said machine is a converter fed, rotating field machine controlled by field orientation and having a bidirectional counter and sine-cosine generator for transforming the count of the counter into components of the rotor angle and wherein:
   a. the sine and cosine components of the measured angular position referred to the stator are determined from the voltages induced in the stator winding;
   b. the sine and cosine of the simulated angular position referred to the rotor are computed in the simulation network;
   c. the sine and cosine of an aggregate angle representing the simulated angular position referred to the stator is computed from said sine and cosine of the simulated angular position referred to the rotor and the sine and cosine values representing the rotor position stored in the counter;
   d. the sine and cosine components of the angular difference are determined from the sine and cosine components of the measured angular position and the sine and cosine components of the simulated angular position;
   e. the sine and cosine of the angular difference are used to form a quantity which depends on the angular difference, said quantity being the quantity used to influence the counter.

3. Apparatus for determining the initial rotor angle in a converter fed, rotating field maching controlled by field orientation and having a bidirectional counter and a sine-cosine generator for transforming the count of the counter into sine and cosine components of the rotor angle comprising:
   a. a clock generator for generating a pulse sequence;
   b. a simulated network comprising:
      i. first means for simulating the exciter machine;
      ii. second means for simulating the stator voltage vector of the rotating machine referred to the rotor having the output of said first means as an input;
      iii. a vector rotator having as inputs the output of said second means and the output of the sine-cosine generator for forming the sine and cosine of a simulated stator voltage vector referred to the stator;
   c. means coupling the output of said clock generator to the excitation winding of the rotating field machine and to the input of said first means;
   d. third means coupled to the stator windings for transforming the voltages induced therein into sine and cosine components of the stator voltage vector;
   e. an inverse vector rotator having as inputs the outputs of said vector rotator and of said third means to develop as outputs the sine and cosine of the angular difference between the angular positions represented by said inputs;
   f. means coupled to the output of said ininverse vector rotator for generating an output proportional to the angular difference represented;
   g. a voltage to frequency converter coupled to the output of said fourth means providing a pulse train output; and
   i. means coupling the output of said voltage to frequency converter to the counter.

4. Apparatus according to claim 2 for use with a synchronous machine wherein said second means includes:
   a. a lead circuit;
   b. an integrating circuit having its input coupled to the output of said lead circuit;
   c. a multiplier having as inputs a quantity proportional to the speed of rotation of the synchronous machine and the output of said integrator;
   d. a vector analyzer having as inputs the output of said lead circuit and the output of said multiplier; and
   e. and means for feeding back the output of said integrating circuit to said lead circuit.

5. Apparatus according to claim 1 wherein said lead circuit is replaced by a proportional circuit having a gain of one-half.

* * * * *

UNITED STATES PATENT AND TRADEMARK OFFICE
CERTIFICATE OF CORRECTION

PATENT NO. : 3 909 688
DATED : September 30, 1975
INVENTOR(S) : Felix Blaschke et al It is certified that error appears in the above-identified patent and that said Letters Patent are hereby corrected as shown below:

in column 5, line 42, change "$R_s$" to --$U_s$-- in column 7, line 55, change formula to read

-- $U_1 \sin\delta = U_1 \cdot \sin(\alpha_{1N} - \alpha_1) = U_1 \cdot (\sin\alpha_{1N} \cdot \cos\alpha_1 - \cos\alpha_{1N} \cdot \sin\alpha_1)$ --

Signed and Sealed this twentieth Day of January 1976

[SEAL]

Attest:

RUTH C. MASON
*Attesting Officer*

C. MARSHALL DANN
*Commissioner of Patents and Trademarks*